US009707989B2

(12) United States Patent
Williams et al.

(10) Patent No.: US 9,707,989 B2
(45) Date of Patent: Jul. 18, 2017

(54) STEERING WHEEL COVER WITH INFLATABLE HAND-HOLDS

(71) Applicants: Samuel John Williams, Lenoir City, TN (US); Geneva JoAnn Williams, Lenoir City, TN (US)

(72) Inventors: Samuel John Williams, Lenoir City, TN (US); Geneva JoAnn Williams, Lenoir City, TN (US)

( * ) Notice: Subject to any disclaimer, the term of this patent is extended or adjusted under 35 U.S.C. 154(b) by 0 days.

(21) Appl. No.: 14/869,766

(22) Filed: Sep. 29, 2015

(65) Prior Publication Data
US 2016/0194022 A1 Jul. 7, 2016

Related U.S. Application Data

(60) Provisional application No. 62/053,770, filed on Sep. 22, 2014.

(51) Int. Cl.
B62D 1/06 (2006.01)
(52) U.S. Cl.
CPC ................. B62D 1/06 (2013.01)
(58) Field of Classification Search
CPC .. B62D 1/04; B62D 1/06; B62D 1/065; Y10T 74/2087
See application file for complete search history.

(56) References Cited

U.S. PATENT DOCUMENTS

| 5,207,713 | A | | 5/1993 | Park | |
|---|---|---|---|---|---|
| 5,743,154 | A | * | 4/1998 | Jacinth | B62D 1/06 74/558 |
| 8,522,641 | B2 | | 9/2013 | Bazinski | |
| 2004/0050205 | A1 | * | 3/2004 | Putnam | B62K 21/26 74/558 |
| 2014/0053679 | A1 | * | 2/2014 | He | B62D 1/06 74/558 |

* cited by examiner

Primary Examiner — Thomas C Diaz
(74) Attorney, Agent, or Firm — Sherif Guindi

(57) ABSTRACT

The disclosed invention is a steering wheel cover with inflatable bladders thereon that provide the driver with a comfortable place to position his or her hands on the steering wheel while preventing injuries associated with maintaining a tight grip on the steering wheel for long periods of time. Said inflatable bladders are placed at roughly the four o'clock and eight o'clock positions and at locations roughly equidistant between the ten and eleven o'clock positions and roughly equidistant between the one and two o'clock positions on the steering wheel, where drivers tend to rest their hands. The bladders are inflatable so that they fit comfortably within the driver's cupped hands, thus avoiding the need to grip the wheel. When the driver's hands are on the bladders, his or her wrists remain in line with the palm of his or her hand, thus relieving fatigue while reducing vibration from the wheel.

24 Claims, 13 Drawing Sheets

STEERING WHEEL COVER WITH INFLATABLE HAND-HOLDS

CROSS-REFERENCE TO RELATED APPLICATIONS

This Nonprovisional Utility Patent Application claims the benefit of Provision Patent Application No. 62/053,770, filed on Sep. 22, 2014, on behalf of the same inventors (Samuel John Williams and Geneva JoAnn Williams) of this current Nonprovisional Patent Application.

BACKGROUND OF THE INVENTION

1. Field of the Invention

The claimed invention is in the field of steering wheel covers for motor vehicles and the like. It was imagined by the inventors while driving large trucks over long distances as long-haul truck drivers. Because of the need for long-haul truck drivers to maintain control over the steering wheels of their vehicles, they tend to grip the steering wheels tightly. Such a tendency, along with the need to drive long distances on a regular basis, can lead to diseases of the hand, elbow, and shoulder, like carpal tunnel syndrome, Missouri metacarpal syndrome, arthritis, and other ailments, due to both a tight grip on the steering wheel and the absence of adequate dampening of vibration transmitted through the steering wheel. The problems with repetitive and prolonged use of the hands, arms, and shoulders and with the ill effects of vibration thereon are well known, as evidenced by, but not limited to, the following scholarly articles: "Manual Labor Metacarpophalangeal Arthropathy in a Truck Driver: A Case Report" (Journal of Chiropractic Medicine (J Chiropr Med. 2010 December; 9(4): 193-199), www.ncbi.nim.nih.gov/pmc/articles/PMC3206566/); "Carpal Tunnel Syndrome" (Penn State Milton S. Hershey Medical Center, pennstatehershey.adam.com/content.aspx?productId=10&pid=10&gid=000034); and "Vibration—Health Effects" (Canadian Centre for Occupational Health and Safety, www.ccohs.ca/oshanswers/phys_agents/vibration/vibration_effect s.html).

2. Description of the Prior Art

The use of steering wheel covers, including those with larger grips on certain portions of the steering wheel are known to the art, but there does not exist a steering wheel cover with a number of inflatable bladders therein, or thereon, that enable an individual driver to adjust the size of certain parts of the steering wheel cover, thus creating surfaces, on the wheel, whose shapes conform to the driver's hands on the parts of the steering wheel where the driver's hands are most comfortably placed when cruising on a highway. Static areas of enlarged grip can only provide comfort and ergonomic benefits to drivers with certain sized hands, or certain comfort preferences, and cannot be adjusted to conform to the needs of every driver. Furthermore, the shape and placement of the bladders in the current invention solve comfort and health issues that have not been completely addressed by the prior art.

U.S. Pat. No. 5,207,713 discloses a safety cover for a steering wheel with an internal bladder or bladders that are adjustable by way of introduction of air or some other fluid. However, unlike the present invention, the use of said safety cover is primarily for safety reasons, by creating a soft surface for the driver in the event of the driver impacting the steering wheel during an automobile accident. Furthermore, said safety cover does not contemplate the use of multiple independently adjustable bladders in order to make the adjustment of said bladders such that they can be adjusted in size or volume to form a proper fit for the size of the individual driver's hands or for said driver's comfort preference.

U.S. Pat. No. 8,522,641 describes a steering wheel with adjustable palm swells. In said patent, the palm swells are incorporated into a steering wheel, rather than a steering wheel cover, making its incorporation into an existing vehicle significantly more difficult and more expensive. Further, said patent discloses bladders that are placed on a radially inward facing surface of the steering wheel rim, thus they increase the size of the steering wheel grip only on the inner, or steering wheel hub-facing, side of the steering wheel. Also, said patent does not disclose the specific placement of the bladders on the surface of the steering wheel, an essential and useful aspect of the current invention.

BRIEF SUMMARY OF THE INVENTION

The invention is a steering wheel cover with adjustable bladders placed thereon or therein. The bladders are shaped to fit comfortably within, and to fill the void within, the driver's palm and fingers, in their relaxed state. The bladders are placed on areas of the steering wheel cover where drivers tend to rest their hands while driving, namely at about the four o'clock and eight o'clock positions and at positions roughly equidistant between the one and two o'clock positions and roughly equidistant between ten and eleven o'clock positions on the steering wheel. The steering wheel cover can be manufactured to fit on any steering wheel, whether it is on a passenger vehicle, a commercial vehicle, an agricultural vehicle, or any other machine that utilizes a steering wheel. The design of the steering wheel cover and of the bladders will provide areas on the steering wheel where the surfaces of the steering wheel cover allow the driver's hands to gently cup that area of the steering wheel cover, rather that gripping the steering wheel, without sacrificing control over the steering wheel, thus preventing, relieving, or treating the symptoms of diseases of the hand, elbow, and shoulder, like carpal tunnel syndrome, Missouri metacarpal syndrome, arthritis, and other ailments.

The steering wheel cover itself (minus the adjustable bladders) will increase the grip size of the steering wheel (increase the diameter of the cross section of the steering wheel rim itself) and will provide a firm grip with a soft outer surface (a grip with a firm or semi-firm inner core and a soft layer thereon).

DETAILED DESCRIPTION

Figure 1:
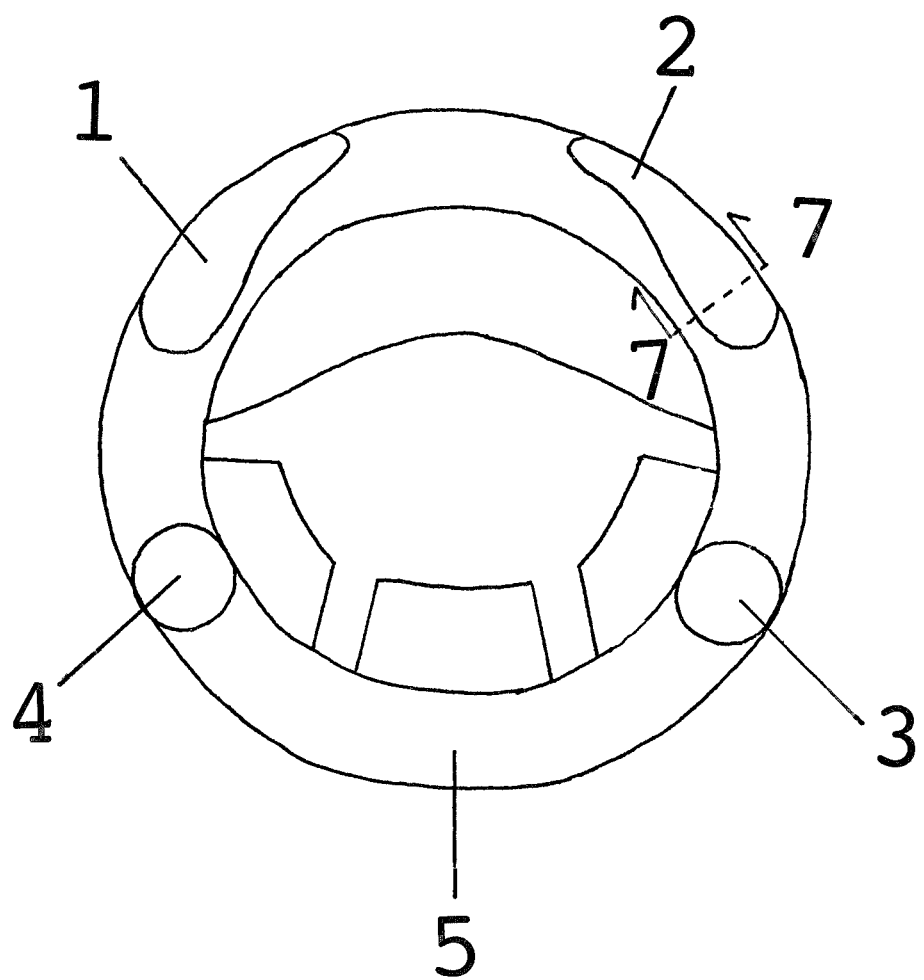
FIG. 1 is a view of the front of a steering wheel, with the steering wheel cover attached, as seen from the driver's point of view.

Those of ordinary skill in the art will understand that the various descriptions of the preferred embodiments of this invention along with the features of the referenced illustrations may be combined in various ways that are not explicitly described or illustrated herein. Those of ordinary skill in the art may combine or modify the features disclosed herein in ways that are consistent with the teachings of the present disclosure. Certain modifications may be made for practical or aesthetic reasons, including, but not limited to, ease of manufacture, cost savings, or new manufacturing methods that achieve the same end, while remaining consistent with the teachings of the present disclosure. The present disclosure is not intended to limit the scope of the invention by excluding obvious or necessary modifications or combinations of the disclosed features.

In the preferred embodiment, the steering wheel cover 5 will have an inner layer 11 made of a nonslip material to prevent the steering wheel cover 5 from slipping on the steering wheel when it is attached to the steering wheel. Said inner layer 11 can be made of rubber or a similar substance with a high coefficient of friction. The rear of the inner layer 11 (the side facing away from the driver and towards the front of the vehicle) will have an opening 16 that extends completely around the rear of the inner layer 11, in order to allow the steering wheel cover 5 to be fitted on the steering wheel with the steering wheel being inside said steering wheel cover 5. As needed for certain types of steering wheels, the inner layer 11 may also have gaps 18 that are placed where the spokes from the steering wheel hub are attached to the steering wheel, thus allowing the steering wheel cover 5 to fit snuggly around the steering wheel and preventing it from protruding where said spokes interrupt the smooth inner circle of the steering wheel. With the exception of said gaps 18, the inner layer 11 will cover the entire surface of the rim of the steering wheel. Said inner surface 11 can be manufactured using existing manufacturing methods, including, but not limited to, extrusion molding, injection molding, textile stitch and sew fabrication, heat stake blow molding, expanded foam molding, and fabric die cut and staking assembly.

The steering wheel cover 5 will increase the diameter of the steering wheel when placed thereon. In addition to the inner surface 11, described above, the steering wheel cover 5 will have a core 10 of firm or semi-firm rubber, foam rubber, polyurethane, or a substance with similar characteristics. Said firm or semi-firm core 10 shall fit over the entire surface of the inner layer 11 of the steering wheel cover 5 (and be shaped like said inner layer 11), with the inner layer 11 being between the core 10 and the steering wheel. The adjustable bladders 1, 2, 3, 4, 6, 7 will be affixed to said core 10 using existing manufacturing methods, including, but not limited to the use of adhesives, sewing, or heat. Said core 10 can be manufactured using existing manufacturing methods, including, but not limited to, extrusion molding, injection molding, and expanded foam molding.

Said core 10 will be covered with a soft solid gel layer 9. Said gel layer 9 will cover the entire surface of said core 10, with the exception of where the inflatable bladders 1, 2, 3, 4, 6, 7 are attached to said core 10. Said gel layer 9 may also be comprised of a gel or other liquid contained in a soft, liquid-tight bladder that covers the surface of the core 10 and equally distributes said gel or liquid throughout the outer surface of said core 10. Said gel layer 9 can be manufactured using existing manufacturing methods, including, but not limited to, extrusion molding, injection molding, textile stitch and sew fabrication, heat stake blow molding (creating a liquid-tight enclosure that can be filled with a gel or other liquid), expanded foam molding, and fabric die cut and staking assembly.

The rear opening 16 of the steering wheel cover 5 can have hook 14 and loop 15 fasteners (like those commonly known as Velcro®) that can be used to secure the sides of the steering wheel cover 5 (on both sides of the opening 16 in the rear of the steering wheel cover 5) together, to hold the steering wheel cover 5 securely around the steering wheel. Said fasteners can be attached to the core 10 or to the gel layer 9 of the steering wheel cover 5. Other types of fasteners, like snaps or buttons can also be used to secure the steering wheel cover 5 across said rear opening 16. Other methods can be used to secure the steering wheel cover 5 around the steering wheel by spanning the rear opening 16 of the steering wheel cover 5 with a string or rope or similar material laced in an alternating fashion from one side of the steering wheel cover 5 to the other (said sides referring to the surfaces of the steering wheel cover 5 along the opening 16 in the rear of said cover 5) and spanning along a significant portion of the rear of the steering wheel cover 5. Other methods to secure the steering wheel cover 5 are to use a zipper or Zip-Lock® style device (or other similar device) to secure the sides of the steering wheel cover 5 together by spanning the opening 16 in the rear of the steering wheel cover. The steering wheel cover 5 can be attached to the steering wheel using any one, or any combination of two or more, of the above-described devices and can also, or solely, be held in place by elastic bands, or similar structures, that span from one part of the rear of the steering wheel cover 5 which covers one portion of the steering wheel to another such part of the steering wheel cover 5 (or from more than one part of the steering wheel cover 5 to more than one other part of the steering wheel cover 5) across the rear of the steering wheel (the side of the steering wheel that faces the front of the vehicle). In addition, or as an alternative, the surfaces of the steering wheel cover 5 on either side of said rear opening 16 in said cover 5 may be made of a substance that is elastic and may be stretched over the steering wheel, thus creating a snug fit, or the core 10 of the steering wheel cover 5 can be constructed of a substance that is sufficiently stiff that it can tightly fit on the steering wheel and remain in place without the use of any fastening device. The inner surface 11 of the steering wheel cover 5 may also be made of such an elastic material and may itself be stretched over the steering wheel in order to create a snug fit without the need for any fastening devices. Though it is preferable for the opening 16 that allows the steering wheel cover 5 to be fitted over the steering wheel to be in the rear of the steering wheel cover 5, said opening 16 can also be on the inside of the steering wheel cover 5, along the inner rim of the steering wheel.

The steering wheel cover 5 will have an outer cover 8 that covers all of the above structures, with the exception of the bladders 1, 2, 3, 4, 6, 7. Said outer cover 8 shall be made of spandex, soft rubber, a substance similar to tennis racquet or golf club grips, or some similar material that affords a good grip and absorbs moisture. Said outer cover 8 will be open in the rear, like the rest of the steering wheel cover 5. Said outer cover 8 can be removable and can secure itself over the rest of the wheel cover 5 through its own elasticity and/or through any of the means described above for securing it to the rest of the steering wheel cover 5 (i.e., hook and loop fasteners, snaps, zipper, etc.). Said outer cover 8 can be manufactured using existing manufacturing methods, including, but not limited to, extrusion molding, injection molding, textile stitch and sew fabrication, heat stake blow molding, expanded foam molding, and fabric die cut and staking assembly.

The inner layer 11, core 10, and gel layer 9 will be adhered together using existing manufacturing methods, including, but not limited to, the use of adhesives, sewing, or heat.

Figure 2:
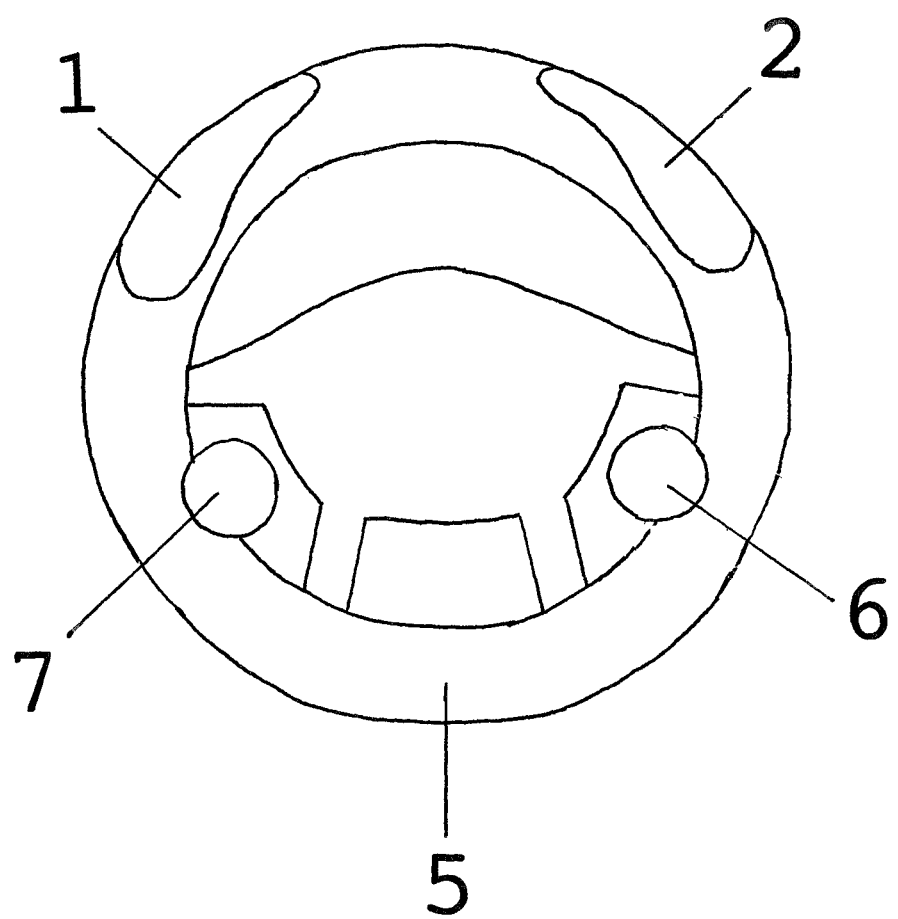
FIG. 2 is a view of a the front of a steering wheel, with a different embodiment of the steering wheel cover attached, in which the lower bladders are attached in such a way that they protrude into the space between the steering wheel and the steering wheel hub, as seen from the driver's point of view.
Figure 3:
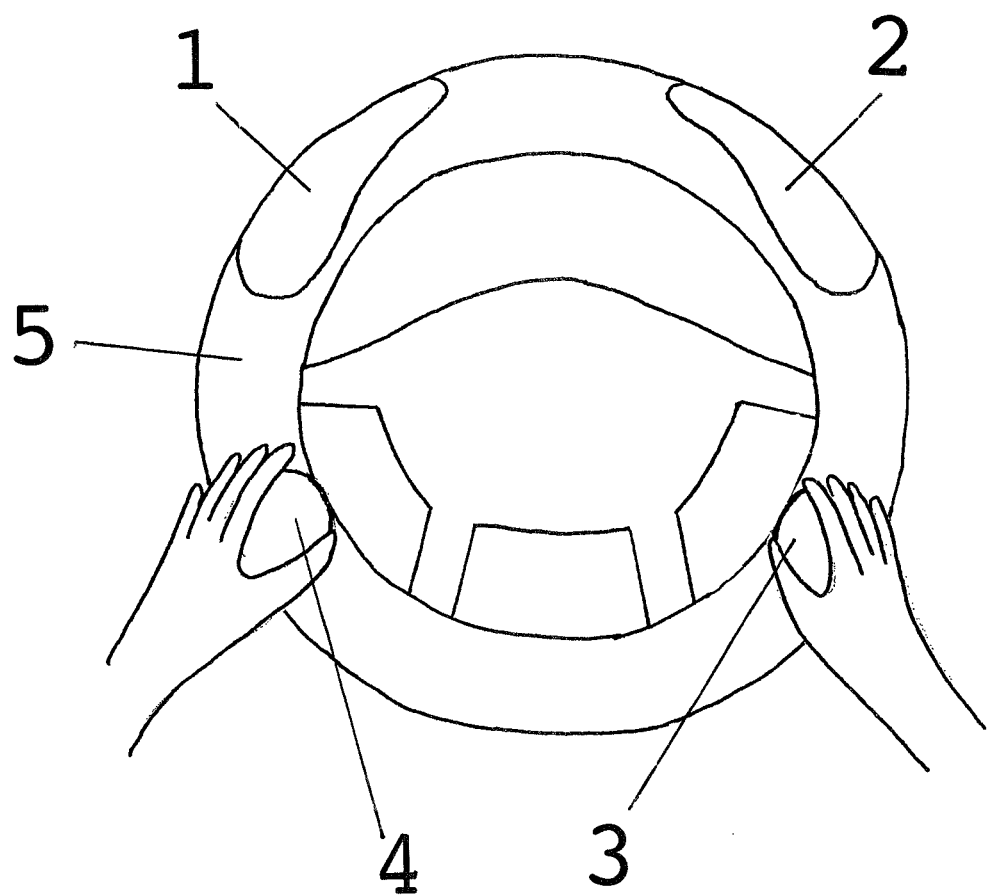
FIG. 3 is a view of the front of a steering wheel, with the steering wheel cover attached and a driver's hands placed on the lower bladders on the steering wheel cover, as seen from the driver's point of view.
Figure 4:
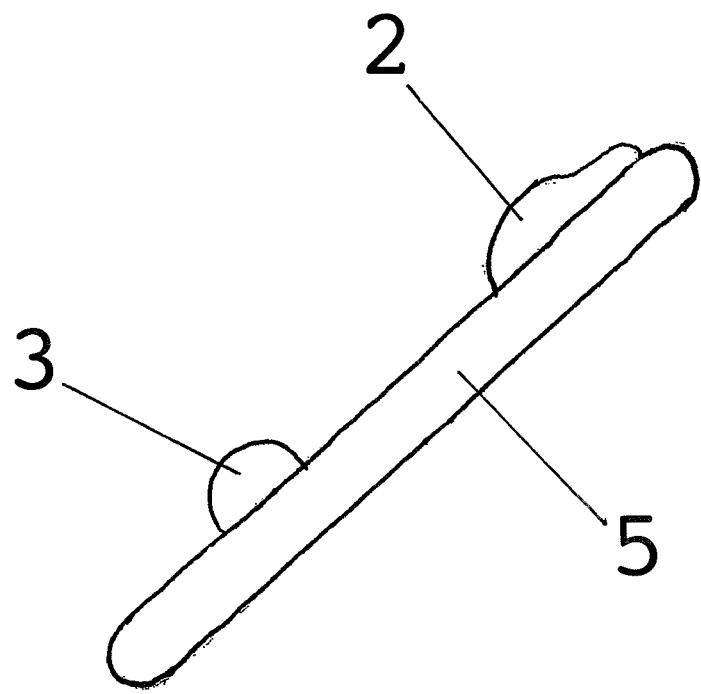
FIG. 4 is a profile view of the right side of a steering wheel, with the steering wheel cover attached.
Figure 5:
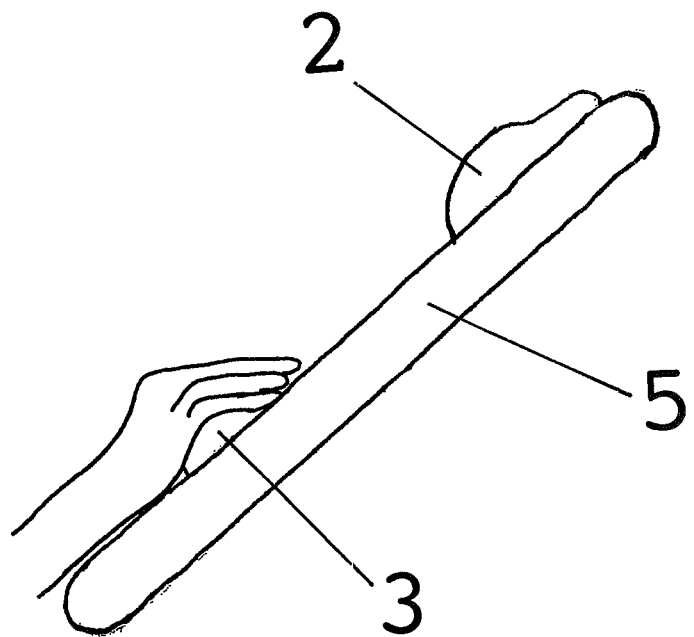
FIG. 5 is a profile view of the right side of a steering wheel, with the steering wheel cover attached and a driver's hand placed on the lower right bladder of the steering wheel cover, illustrating how the driver's hand cups the bladder and the wrist remains in line with the hand.
Figure 6:
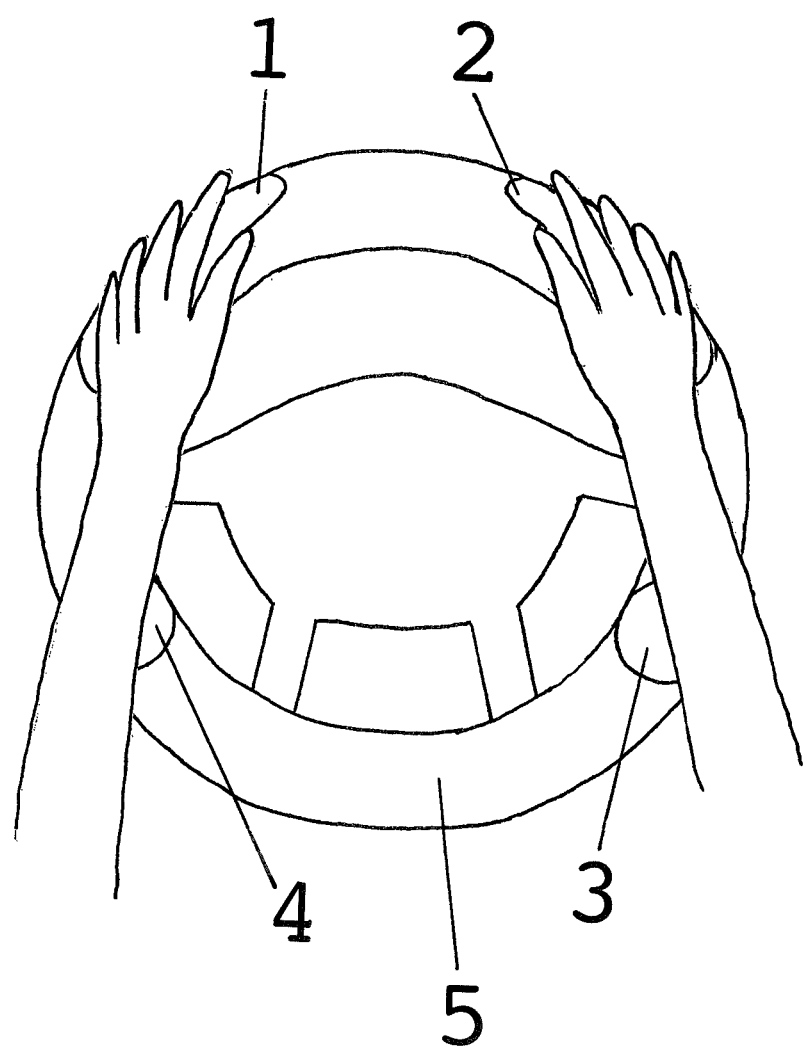
FIG. 6 is a view of the front of a steering wheel, with the steering wheel cover attached and a driver's hands placed on the upper bladders on the steering wheel cover, as seen from the driver's point of view.
Figure 7:
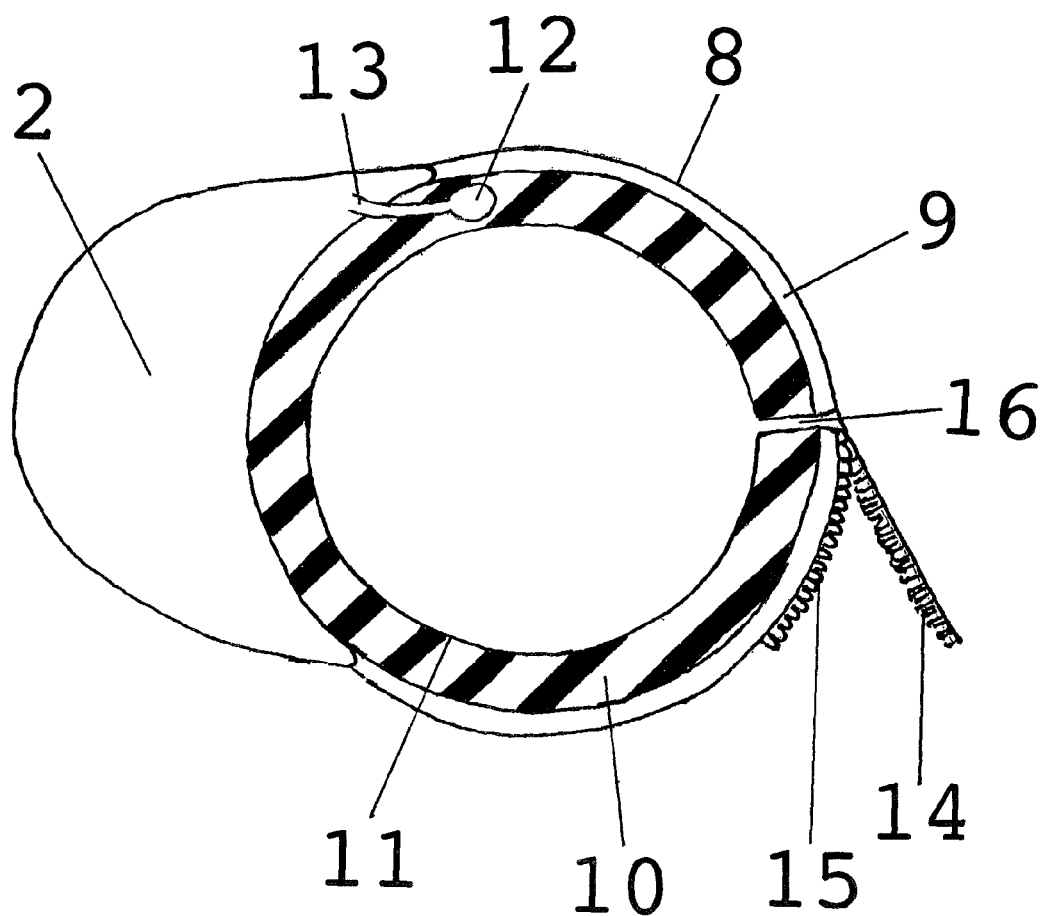
FIG. 7 is a cross-sectional view of the steering wheel and steering wheel cover taken along the line 7-7 of FIG. 1.
Figure 8:
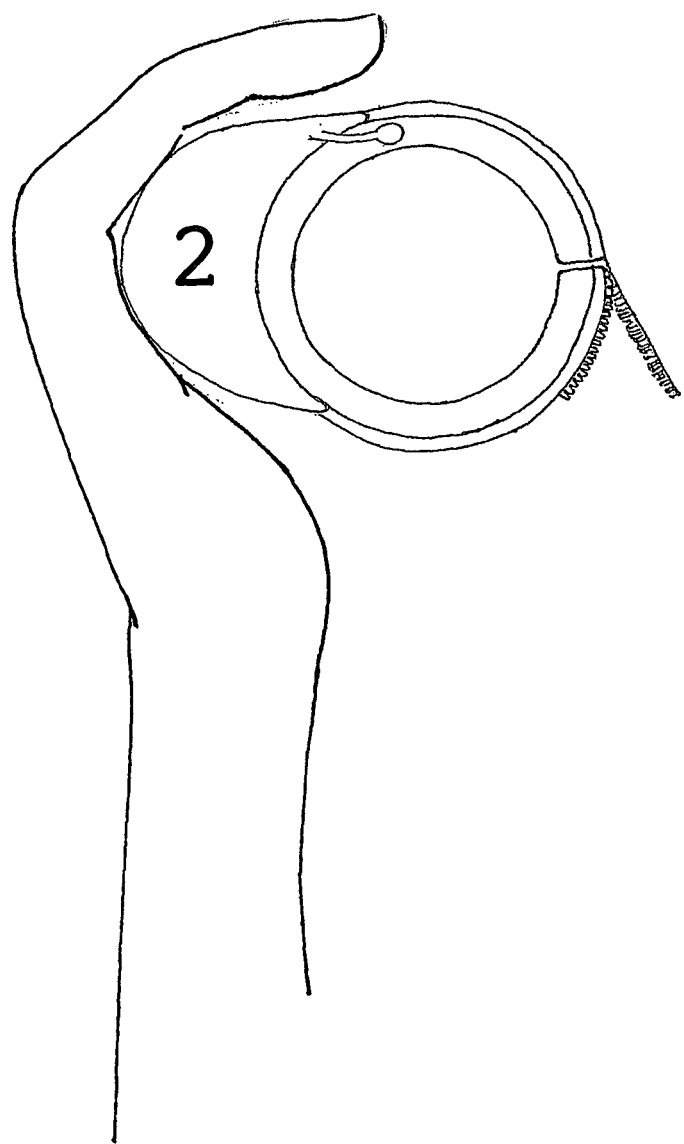
FIG. 8 is a cross-sectional view of the steering wheel and steering wheel cover taken along the line 7-7 of FIG. 1 with the driver's hand placed on the right upper bladder, illustrating how the driver's hand cups the bladder and the wrist remains in line with the hand.
Figure 9:
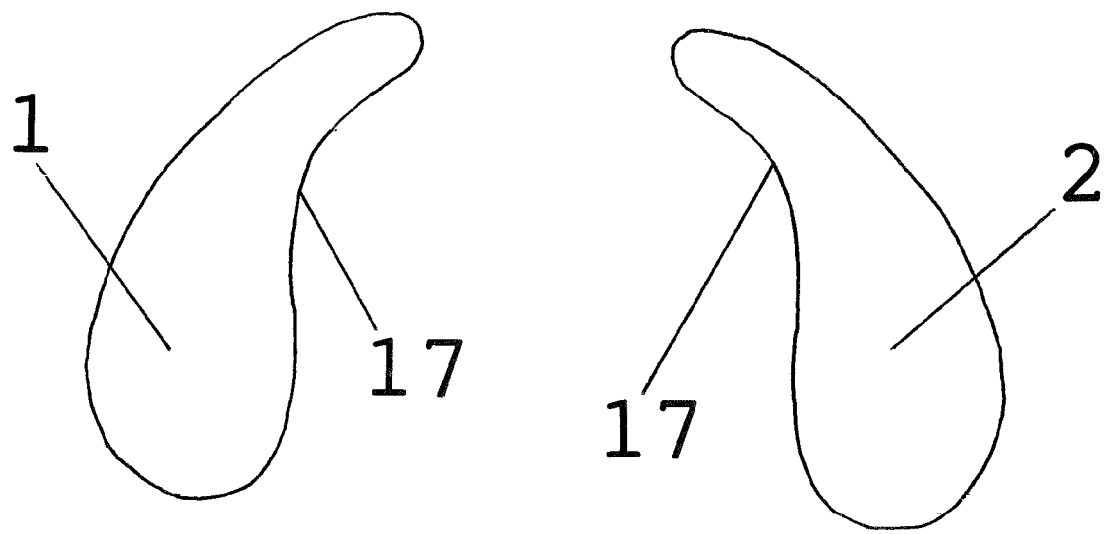
FIG. 9 is a frontal view of the upper bladders as they would be oriented on the steering wheel cover, from the driver's perspective.
Figure 10:
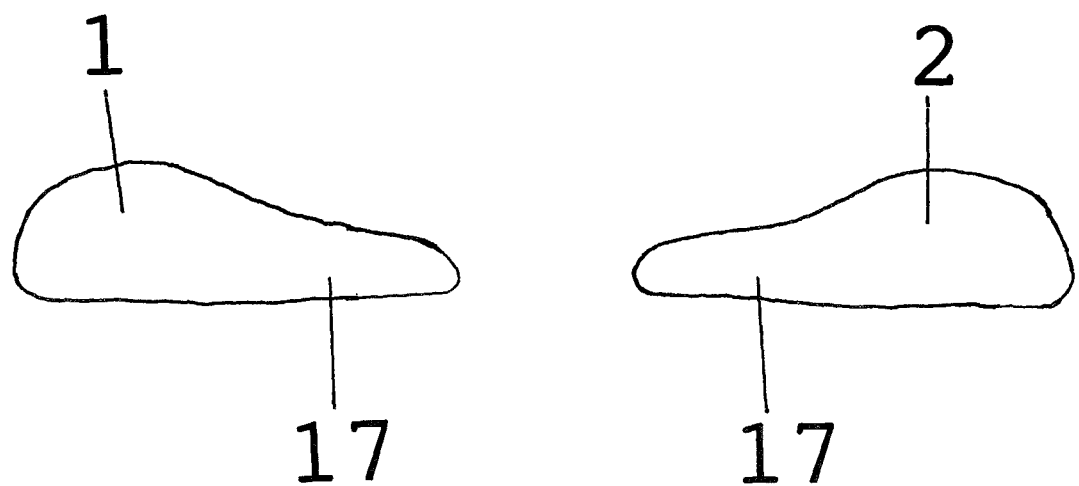
FIG. 10 is another view of the upper bladders in FIG. 9 as they would appear if rotated 90 degrees forward, or into the plane of the page.
Figure 11:
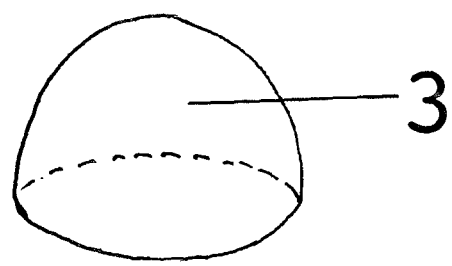
FIG. 11 is a view of one of the hemispherical bladders from FIG. 1, FIG. 3, FIG. 4, FIG. 5, and FIG. 6 that would be attached on the lower portion of the steering wheel cover.
Figure 12:
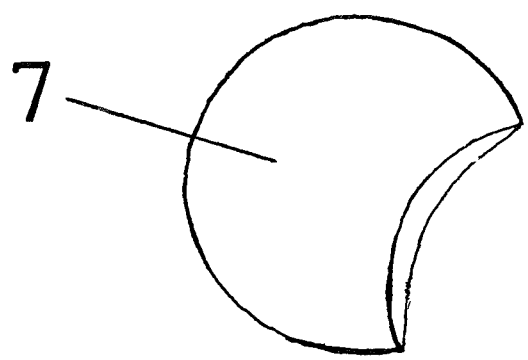
FIG. 12 is a view of one of the lower bladders from the embodiment of the steering wheel cover shown in FIG. 2.

Inflatable bladders 1, 2, 3, 4, 6, 7 are attached to the core 10 of the steering wheel cover. The adjustable bladders have two shapes, one that is roughly hemispherical 3, 4 and one that is roughly ellipsoidal 1, 2 with a width that is longer than its height. As is disclosed in the drawings, said ellipsoidal bladders 1, 2 may be further contoured so that they are fatter on the end where the driver's palm touches them and are thinner and have a thumb indention 17 where the driver's thumb touches them, so that the driver's thumb rests comfortably within said indentation 17. The roughly hemispherical bladders 3, 4 can be adjusted in size, by adding or removing air or some other fluid therefrom, to fit comfortable within the driver's palms in their relaxed state, while filling the space created by his or her palms, thus supporting the relaxed state of the palms. The ellipsoidal bladders 1, 2 have a width that is roughly that of a driver's hand, with the fingers and thumb in their relaxed state (approximately 12 to 18 cm) and a height at their tallest point that is slightly shorter than the distance from the inner circumference to the outer circumference of the steering wheel cover 5, when it is attached to a steering wheel (approximately 5 to 8 cm). Said ellipsoidal bladders 1, 2 can similarly be inflated to comfortably fit within, and provide support for, the driver's palm and hand in their relaxed position. Ideally, two hemispherical bladders 3, 4 are located on the surface of the steering wheel cover 5 (when said cover 5 is attached to a steering wheel) that faces the driver, one bladder 3 at about, or just below, the four o'clock position and one bladder 4 at about, or just below, the eight o'clock position, with said positions referring to the positions on a circular, analog clock-face, and being translated to the same positions on a circular steering wheel. Also, ideally, two ellipsoidal bladders 1, 2 are placed on the surface of the steering wheel cover 5 (when said cover 5 is attached to a steering wheel) that faces the driver, one bladder 2 centered at the position roughly equidistant between the one o'clock and two o'clock positions, and the other bladder 1 centered at the position roughly equidistant between the ten o'clock and eleven o'clock positions. Said bladders 1, 2 should be placed so that their longer portions (their width) follow the curve of the steering wheel cover 5 when it is attached to a steering wheel and are roughly level with the outer rim of the steering wheel cover 5. If upper bladders 1, 2 of the shape disclosed in the drawings are used, they should be placed so that the ends of the bladders 1, 2 with the thumb indentions 17 are closer to each other than are the fatter ends of the bladders 1, 2. All of the bladders 1, 2, 3, 4 extend outwardly from the driver-facing surface of the steering wheel when inflated. The ellipsoidal bladders 1, 2 do not increase the outer circumference of the steering wheel cover 5 when inflated, but remain even with the surface around the outer circumference the steering wheel cover 5 when the cover 5 is attached to a steering wheel. In the alternative embodiment of FIG. 2, the lower bladders 6, 7 are more spherical and are attached roughly at, or just below, the four o'clock and eight o'clock positions at a point on the steering wheel cover 5 between the inside rim of the steering wheel cover 5 and the side of the steering wheel cover 5 that faces the driver. Said bladders 6, 7 can further rest against the spokes and hub of the wheel for increased stability.

Figure 13:
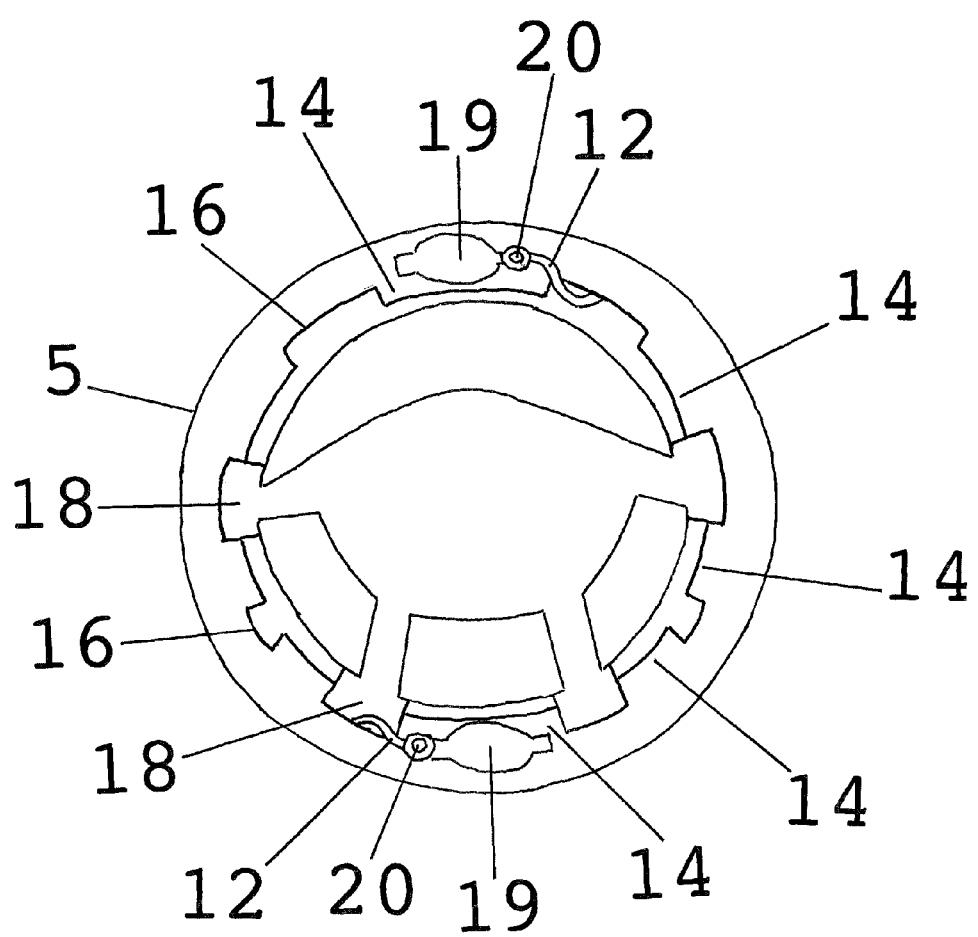
FIG. 13 is a rear view of a steering wheel with the steering wheel cover attached but without the removable outer cover of the steering wheel cover.
Figure 14:
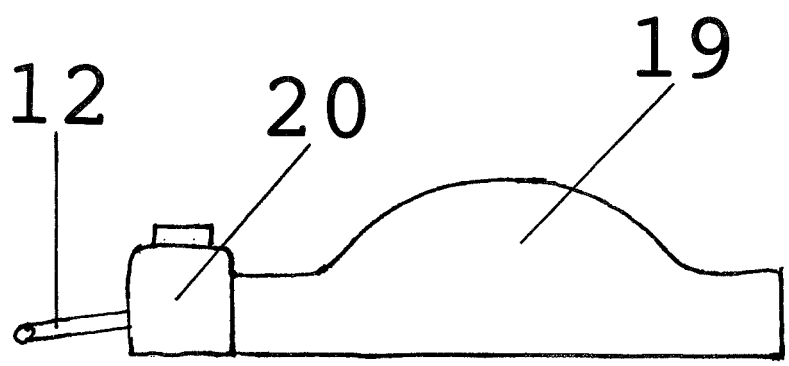
FIG. 14 is a side view of the type of bulb pump and valve assembly that can be used to inflate the bladders.
Figure 15:
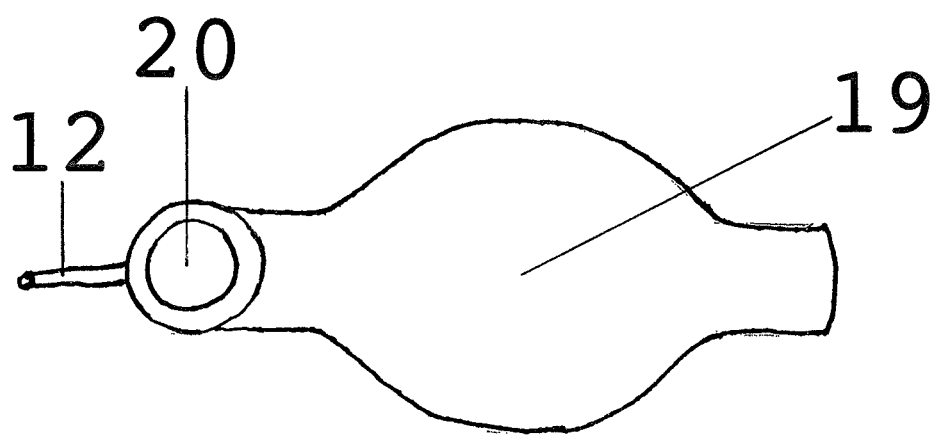
FIG. 15 is a view of the top of the bulb pump and valve assembly of FIG. 14.

Said bladders 1, 2, 3, 4, 6, 7 can be made of rubberized vinyl or some other rubber or rubber-like material of sufficient thickness and elasticity that the bladders 1, 2, 3, 4, 6, 7 will remain firm at varying levels of inflation. Said material should have a high coefficient of friction so that the driver's hands will not slide off of the bladders 1, 2, 3, 4, 6, 7. Said bladders 1, 2, 3, 4, 6, 7 shall be adjustable in volume by filling them with air or some other fluid, thus allowing the user to fill the bladder to a size that is suitable to his or her hand size. The bladders 1, 2, 3, 4, 6, 7 can be filled with a bulb pump 19 and valve 20 assembly that is well known in the art. Said bulb pump 19 can be pumped to inflate the bladders 1, 2, 3, 4, 6, 7, and the attached valve 20 can release air from the bladders 1, 2, 3, 4, 6, 7 when depressed. FIG. 13 illustrates the use of two bulb pump 19 and valve 20 assemblies affixed to the rear of the steering wheel cover 5 (the side facing away from the driver and towards the front of the vehicle), with one bulb pump 19 and valve 20 assembly attached to the top of the rear of the steering wheel cover 5 and the other attached to the bottom of the rear of the steering wheel cover 5. Said bulb pump 19 and valve 20 assemblies are attached to the hook 14 portions of two of the hook 14 and loop 15 fasteners used to secure the steering wheel cover 5 to the steering wheel. This will allow the driver to easily reach around to the rear of the steering wheel cover 5 to pump the bulb pump 19 or depress the valve 20 with his or her fingers or thumbs. The upper bulb pump 19 and valve 20 assembly delivers air to a flexible tube 12 that is embedded in the core 10 of the steering wheel cover 5. Said flexible tube 12 delivers air to both of the upper bladders 1, 2 via two other flexible tubes 13, with one of said other flexible tubes 13 delivering air to each bladder 1, 2 where that bladder 1, 2 is connected to the core 10 of the steering wheel cover 5. Air is delivered to the lower bladders 3, 4 or 6, 7 from the lower bulb pump 19 and valve 20 assembly in an identical fashion. In the alternative, a single pump 19 and valve 20 assembly can be used (which supplies air to all of the bladders) or four pump 19 and valve 20 assemblies can be used (one for each bladder). The bulb pump 19 and valve 20 assemblies can be attached to the steering wheel cover 5 in different ways or in different locations, or they can be manufactured to be incorporated within the steering wheel cover 5 itself. The bladders 1, 2, 3, 4, 6, 7 can also be inflated using a piston pump (like a bicycle pump), an electric pump, or any other method of inflation. If a pump is not permanently attached, via tubes, to the bladders 1, 2, 3, 4, 6, 7, each bladder will have a valve that will allow the user to insert the end of a pump and add air, or other fluid, to inflate the bladder to the size desired by the user. Said valve can be a simple rubber valve as is used in sports balls, a duckbill valve, a non-return valve with a fixed plug (as is used in inflatable pool floats), a Schrader valve (as is used in automobile, bicycle, and other vehicle tires), all of which are well known in the art, or some other type of valve. Said bladders 1, 2, 3, 4, 6, 7 can be manufactured using existing manufacturing methods, including, but not limited to, heat stake blow molding, textile stitch and sew fabrication, and fabric die cut and staking assembly.

Though the disclosed invention specifies the shape and placement of four inflatable bladders, any number of, or shape of, inflatable bladders can be attached to the steering wheel cover in any number of locations, or the bladders can wrap around the steering wheel cover, thus increasing the overall grip of that portion of, or of the entire, steering wheel cover, while remaining consistent with the teachings of the present disclosure.

What is claimed is:

1. A steering wheel cover for covering a steering wheel to be operated by a driver, the steering wheel cover comprising:
   (a) a piece of flexible material extending around the circumference of the steering wheel comprising:
     a. an inner layer that contacts the steering wheel;
     b. a core that is adhered to said inner layer; and
     c. a outer layer that fits around said core; and
   (b) a first plurality of inflatable bladders wherein said first plurality of inflatable bladders are attached to portions of said piece of flexible material that face the driver, comprising:
     a. a first bladder of said plurality of inflatable bladders, wherein said first bladder is substantially ellipsoidal and is attached at a first acute angle extending clockwise from a twelve o'clock position, from the driver's perspective, on said steering wheel;
     b. a second bladder of said plurality of inflatable bladders, wherein said second bladder is substantially ellipsoidal and is attached at a second acute angle extending counterclockwise from a twelve o'clock position, from the driver's perspective, on said steering wheel;
     wherein each of said first and second bladders are 12 to 18 centimeters in width, with the width being the dimension running along the circumference of the steering wheel, and 5 to 8 centimeters in height, with the height being the dimension running radially from the center of the steering wheel, wherein said height is shorter than a distance from an inner rim to an outer rim of said steering wheel cover, when said steering wheel cover is attached to a steering wheel; and,
   (c) a second plurality of inflatable bladders, comprising:
     a. a third bladder of said plurality of inflatable bladders, wherein said third bladder is attached at a first obtuse angle extending clockwise from a twelve o'clock position, from the driver's perspective, on said steering wheel; and,
     b. a fourth bladder of said plurality of inflatable bladders, wherein said fourth bladder is attached at a second obtuse angle extending counterclockwise from a twelve o'clock position, from the driver's perspective, on said steering wheel;
     wherein the shapes of each of said second plurality of inflatable bladders are substantially identical and are members of a group consisting of (a) substantially hemispherical and (b) substantially spherical.

2. The steering wheel cover of claim 1, wherein each of said second plurality of inflatable bladders is substantially hemispherical and is attached to a portion of said piece of flexible material that faces the driver.

3. The steering wheel cover of claim 1, wherein each of said second plurality of inflatable bladders is substantially spherical and is attached between the inside rim of the steering wheel cover and a portion of the steering wheel cover that faces the driver.

4. The steering wheel cover of claim 1, wherein said piece of flexible material further comprises a gel layer adhered to said core wherein said gel layer is interposed between said core and said outermost layer.

5. The steering wheel cover of claim 1, wherein said outermost layer is removable.

6. The steering wheel cover of claim 1, wherein said outermost layer is made of a substance that is a member of a group consisting of (a) spandex and (b) soft rubber.

7. The steering wheel cover of claim 1, wherein said inner layer is made of non-slip material with a high coefficient of friction.

8. The steering wheel cover of claim 1, wherein said core is made of a substance with a property that is a member of a group consisting of (a) firm and (b) semi-firm.

9. The steering wheel cover of claim 1, wherein said core is made of a substance that is a member of a group consisting of (a) rubber, (b) foam rubber, and (c) polyurethane.

10. The steering wheel cover of claim 1, wherein each of said bladders is made of an elastic substance with a high coefficient of friction.

11. The steering wheel cover of claim 1, wherein each of said first and second bladders is comprised of:
    a thicker portion located distally from the twelve o'clock position, from the driver's perspective, on said steering wheel, a thinner portion, with an indentation for the driver's thumb, located proximally to the twelve o'clock position, from the driver's perspective, on said steering wheel, and wherein said indentation is located on the portion of the bladder facing the hub of said steering wheel, and
    an upper edge that is substantially level with an outer circumference of the steering wheel cover.

12. The steering wheel cover of claim 1, wherein each of said first and second plurality of bladders is inflatable by introduction of air or another fluid therein.

13. The steering wheel cover of claim 1, wherein said first bladder is centered between the one o'clock and two o'clock positions, from the driver's perspective, on said steering wheel; said second bladder is centered between the ten o'clock and eleven o'clock positions, from the driver's perspective, on said steering wheel; said third bladder is centered at approximately the four o'clock position, from the driver's perspective, on said steering wheel; and said fourth bladder is centered at approximately the eight o'clock position, from the driver's perspective, on said steering wheel.

14. The steering wheel cover of claim 1, wherein each of said first and second plurality of bladders is attached to said core.

15. The steering wheel cover of claim 1, wherein each of said first and second plurality of bladders is inflatable by at least one air pump.

16. The steering wheel cover of claim 15, wherein said at least one air pump includes at least one bulb pump and valve assembly.

17. The steering wheel cover of claim 15, wherein said at least one pump delivers air to flexible tubes.

18. The steering wheel cover of claim 17, wherein said flexible tubes are imbedded in the core of the steering wheel cover.

19. The steering wheel cover of claim 17, wherein said flexible tubes deliver air to each of said first and second plurality of bladders.

20. The steering wheel cover of claim 15, wherein said at least one air pump is attached to the steering wheel cover.

21. The steering wheel cover of claim 15, wherein said at least one air pump includes a first air pump that inflates said first plurality of bladders and a second air pump that inflates said second plurality of bladders.

22. The steering wheel cover of claim 15, wherein said at least air pump is attached to a rear portion of the steering wheel cover.

23. The steering wheel cover of claim 15, wherein said at least one air pump is incorporated into the steering wheel cover.

24. The steering wheel cover of claim 1, wherein said piece of flexible material is secured to the steering wheel via fasteners that attach to opposite sides of said piece of flexible material.

* * * * *